United States Patent
Tan et al.

(10) Patent No.: US 8,549,821 B2
(45) Date of Patent: Oct. 8, 2013

(54) METHOD AND SYSTEM FOR LOADING DIGITAL CONTENT INTO A DIGITAL STORAGE DEVICE AND SUBSEQUENT PACKAGING

(75) Inventors: Keng Wah Tan, Singapore (SG); Woon Hua Edwin Kuah, Singapore (SG); Boon Tien Tyo, Singapore (SG)

(73) Assignee: Creative Technology Ltd, Singapore (SG)

( * ) Notice: Subject to any disclaimer, the term of this patent is extended or adjusted under 35 U.S.C. 154(b) by 401 days.

(21) Appl. No.: 13/059,108

(22) PCT Filed: Aug. 21, 2009

(86) PCT No.: PCT/SG2009/000293
§ 371 (c)(1),
(2), (4) Date: Feb. 15, 2011

(87) PCT Pub. No.: WO2010/024781
PCT Pub. Date: Mar. 4, 2010

(65) Prior Publication Data
US 2011/0154781 A1    Jun. 30, 2011

(30) Foreign Application Priority Data
Sep. 1, 2008 (SG) .................... 200806438

(51) Int. Cl.
*B65B 61/00* (2006.01)
*B65B 5/06* (2006.01)

(52) U.S. Cl.
USPC ............... 53/415; 53/474; 53/136.1; 53/237

(58) Field of Classification Search
USPC ........ 53/415, 445, 474, 136.1, 154, 155, 237, 53/238
See application file for complete search history.

(56) References Cited

U.S. PATENT DOCUMENTS

| | | | |
|---|---|---|---|
| 4,678,390 A * | 7/1987 | Bonneton et al. | 414/282 |
| 5,469,692 A * | 11/1995 | Xanthopoulos | 53/474 |
| 5,829,229 A * | 11/1998 | Hyatt et al. | 53/445 |
| 7,062,893 B2 * | 6/2006 | Lawton et al. | 53/564 |
| 2002/0049717 A1 * | 4/2002 | Routtenberg et al. | 707/1 |
| 2004/0016209 A1 * | 1/2004 | Roth | 53/411 |
| 2005/0011163 A1 * | 1/2005 | Ehrensvard et al. | 53/410 |
| 2005/0050571 A1 * | 3/2005 | Wisnudel et al. | 720/718 |
| 2005/0066626 A1 * | 3/2005 | Hutcheon | 53/445 |
| 2005/0076020 A1 | 4/2005 | Huntley et al. | |

FOREIGN PATENT DOCUMENTS

| | | | | |
|---|---|---|---|---|
| WO | WO 2005032115 A2 * | 4/2005 | | 348/E5.007 |
| WO | WO2005109882 A2 | 11/2005 | | |

* cited by examiner

*Primary Examiner* — Stephen F Gerrity
(74) *Attorney, Agent, or Firm* — Creative Technology Ltd.

(57) ABSTRACT

There is provided a method for loading varied pre-determined digital content into a plurality of digital storage devices, and subsequently providing each digital storage device with varied pre-determined accessories. It is preferable that the digital content loaded into the digital storage device is not identifiable at the digital content loading post, and the consolidated digital storage device and the pre-determined accessories are shipped to particulars of the shipping label. A corresponding system is also provided.

17 Claims, 4 Drawing Sheets

METHOD AND SYSTEM FOR LOADING DIGITAL CONTENT INTO A DIGITAL STORAGE DEVICE AND SUBSEQUENT PACKAGING

FIELD OF INVENTION

The present invention relates to the field of manufacturing and packaging, particularly in relation to a method and system which ensures accurate loading of pre-determined digital content into a digital storage device and which ensures that the digital storage device is correctly dispatched to the correct recipient.

BACKGROUND

An increasing rate of adoption for "on-the-go" entertainment has led to an exponential increase in the take-up of portable digital entertainment devices in many parts of the world. Currently, users would purchase portable digital entertainment devices without any content, and the users would subsequently download digital content of their choice into their portable digital entertainment devices. This is a hassle for many users, as some of the digital content may be stored in a format which may not be recognizable for play back by the portable digital entertainment device, and a substantial amount of time is required to convert (transcode) the digital content into a format which is recognizable for play back by the portable digital entertainment device.

It is convenient for users if producers of portable digital entertainment devices could also include content in the devices at a point of purchase. However, it is evident that nearly all users will have varying preferences relating to the digital content which they consume, and providing a fixed menu of content in the devices would be pointless if the provided content did not appeal to the users. Such instances are undesirable as the users may be dissuaded from purchasing the portable digital entertainment devices after being put off by the unwanted content, and the users may require time to replace the unwanted content with preferred content.

In light of the aforementioned, it is most preferable that portable digital entertainment devices were sold with users being able to select content which they desire, and it is necessary for a manufacturing process which allows for varying content to be continually uploaded to a plurality of portable digital entertainment devices simultaneously to be in operation. Furthermore, the privacy of users who purchase the portable digital entertainment devices with content selected by the users would also need to be safeguarded for the users' peace of mind. Finally, the users' orders for the portable digital entertainment device must be correctly delivered to the correct address as per the users' orders, as failure to do so would also compromise the privacy of the users.

SUMMARY

In a first aspect, there is provided a method for loading varied pre-determined digital content into a plurality of digital storage devices, and subsequently providing each digital storage device with varied pre-determined accessories. The method includes locating each digital storage device on a platform, the platform including a platform identification object and each digital storage device including at least one device identification object; determining availability of a digital content loading post when the platform is at a predetermined position; transporting the platform to an available digital content loading post; identifying the digital storage device on the platform at the available digital content loading post; associating the identified digital storage device with an order; loading digital content into the digital storage device at the available digital content loading post in accordance with the order; transporting the digital storage device to an available packaging post; identifying the digital storage device at the available packaging post; associating the digital storage device with the order; accounting for the predetermined accessories provided in accordance with the order; printing a shipping label when the identity of the digital storage device matches with the accounted pre-determined accessories in the order; and consolidating the digital storage device and the pre-determined accessories together into a single package.

It is preferable that the digital content loaded into the digital storage device is not identifiable at the digital content loading post, and the consolidated digital storage device and the pre-determined accessories are shipped to particulars of the shipping label. The method may further include checking a capability of the digital storage device.

The digital content may be selected from, for example, audio files, movie files, image files, application files, firmware update files, any combination of the aforementioned and so forth. The identification object may be selected from, for example, an RFID tag, a visual indicia tag, a bar code tag, a serial number tag, any combination of the aforementioned and so forth. The digital storage device may be selected from, for example, a digital storage chip in any particular form, a portable hard disk drive, a digital media player, a mobile telephone, any combination of the aforementioned and so forth. In addition, the pre-determined accessories may be selected from, for example, a set of earphones, a set of headphones, a set of speakers, a digital storage device protector, a digital storage device case, a power source for the digital storage device, a cable for connection to the digital storage device, a lanyard for carrying the digital storage device, any combination of the aforementioned items and so forth.

Preferably, the pre-determined position includes at least one sensor to determine a presence of the platform, and at least a first controller to guide the platform to the available digital content loading post.

The digital content loading post preferably includes a content loading controller for controlling the digital loading post; and at least one data connector for a functional connection to either the platform or the digital storage device, the connection being via either a wired connection or a wireless connection, the at least one connector being connected to the content loading controller. It is advantageous that workability information for the digital content loading post is written by the content loading controller onto the platform identification object.

The packaging post preferably includes a packaging controller for aiding packaging of both the digital storage device and the pre-determined accessories; at least one display connected to the packaging controller to view a list of the pre-determined accessories ordered with the digital storage device; and at least one data reader connected to the packaging controller to obtain data from the identification object of the digital storage device, the data reader being for obtaining data selected from a group comprising: RF signals, visual indicia, bar codes, serial numbers, and any combination of the aforementioned.

Finally, the method may further include associating the order with the device identification object; coupling the digital storage device to the platform; and resetting the platform identification object.

In a second aspect, there is provided a system for loading varied predetermined digital content into a plurality of digital storage devices, and subsequently providing each digital storage device with varied pre-determined accessories. The system includes a platform with a digital storage device, the platform including a platform identification object and the digital storage device including at least one device identification object; a pre-determined position with a first controller for guiding the platform to an available digital content loading post, the digital content loading post being for loading of digital content into the digital storage device; and a packaging post for consolidating the digital storage device and the accessories. It is advantageous that the digital content loaded into the digital storage device is not identifiable at the digital content loading post, and the consolidated digital storage device and the pre-determined accessories are shipped to particulars of a shipping label printed at the packaging post. It is preferable that the predetermined position may include at least one sensor to determine a presence of the platform.

The digital content may be selected from, for example, audio files, movie files, image files, application files, firmware update files, any combination of the aforementioned and so forth. The identification object may be selected from, for example, an RFID tag, a visual indicia tag, a bar code tag, a serial number tag, any combination of the aforementioned and so forth. The digital storage device may be selected from, for example, a digital storage chip in any particular form, a portable hard disk drive, a digital media player, a mobile telephone, any combination of the aforementioned and so forth. In addition, the pre-determined accessories may be selected from, for example, a set of earphones, a set of headphones, a set of speakers, a digital storage device protector, a digital storage device case, a power source for the digital storage device, a cable for connection to the digital storage device, a lanyard for carrying the digital storage device, any combination of the aforementioned items and so forth.

The digital content loading post preferably includes a content loading controller for controlling the digital loading post; and at least one data connector for a functional connection to either the platform or the digital storage device, the connection being via either a wired connection or a wireless connection, the at least one connector being connected to the content loading controller. It is advantageous that workability information for the digital content loading post is written by the content loading controller onto the platform identification object.

The packaging post preferably includes a packaging controller for aiding packaging of both the digital storage device and the pre-determined accessories; at least one display connected to the packaging controller to view a list of the pre-determined accessories ordered with the digital storage device; and at least one data reader connected to the packaging controller to obtain data from the identification object of the digital storage device, the data reader being for obtaining data selected from a group comprising: RF signals, visual indicia, bar codes, serial numbers, and any combination of the aforementioned.

Preferably, the digital storage device may be functionally coupled to the platform.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
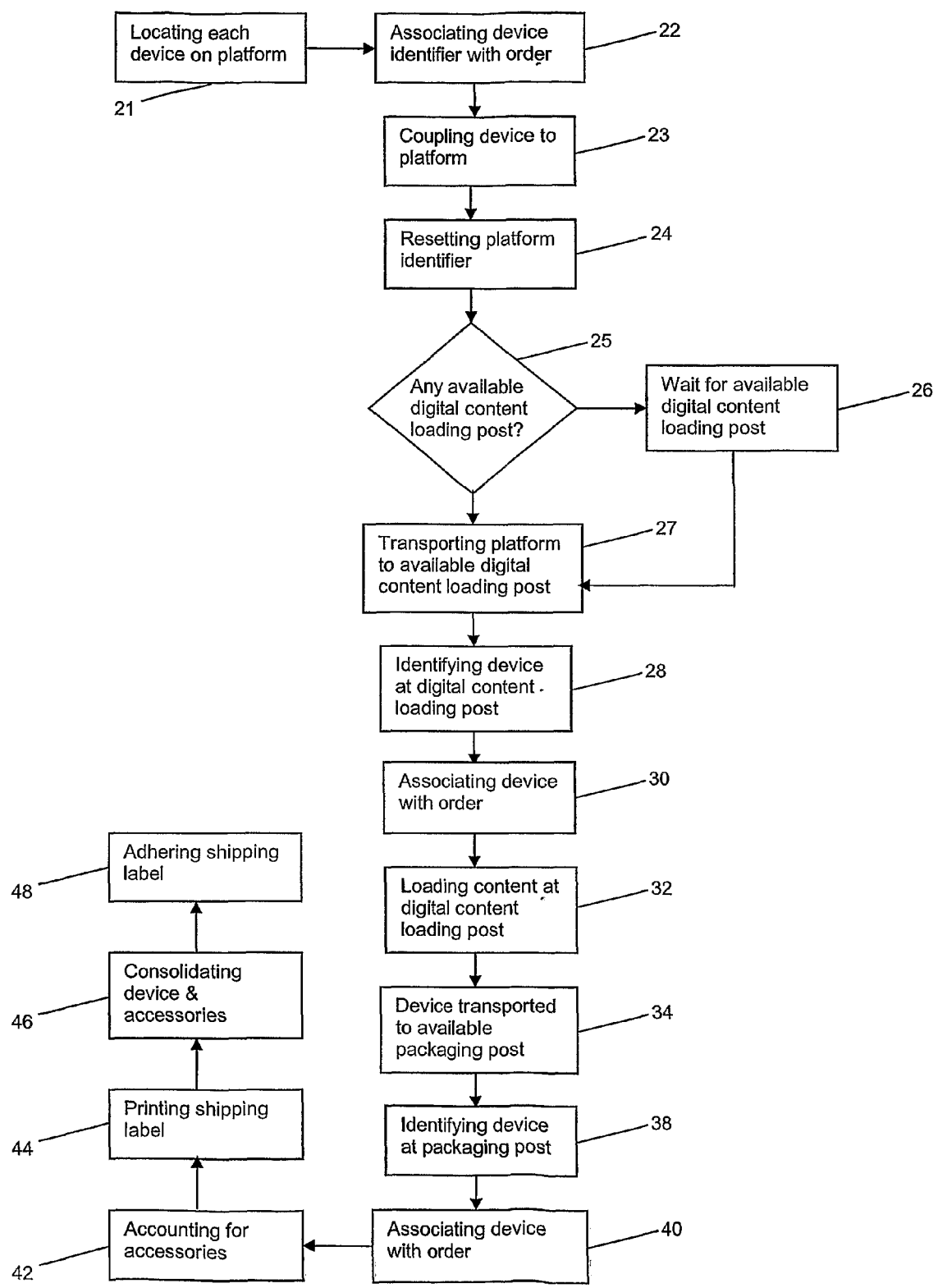
FIG. 1 shows a process flow for a method of the present invention.
Figure 2:
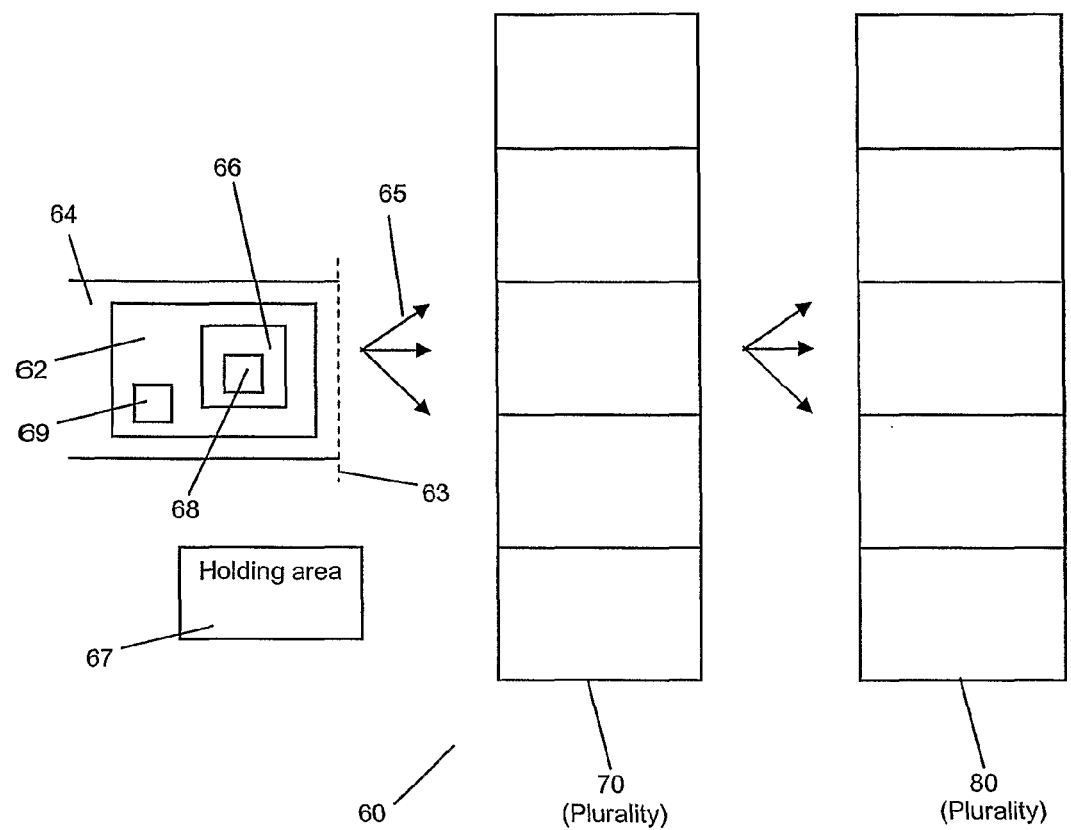
FIG. 2 shows an overview of a system of the present invention.

In a first aspect with reference to FIGS. 1 and 2, there is shown a process flow for a method 20 for loading varied pre-determined digital content into a plurality of digital storage devices, and subsequently providing each digital storage device with varied pre-determined accessories. The digital content may be pre-determined by a user/purchaser of each digital storage device 66. The digital content may be selected by the user/purchaser of each digital storage device 66 such that the digital storage device 66 obtained by the user/purchaser contains digital content which is desired by the user/purchaser. The selection of the digital content may either be a component of a process to purchase a digital storage device 66 or may be a separate financial transaction for the purchase of digital content. Similarly, the selection of the accessories may be a component of a process to purchase a digital storage device 66. A list of the digital content and accessories selected by the user/purchaser may be stored at a storage facility which is accessible from a location carrying out the method 20.

The digital content may be, for example, audio files, movie files, image files, application files, firmware update files, or any combination of the aforementioned. The digital storage device 66 may be, for example, a digital storage chip in any particular form, a portable hard disk drive, a digital media player, a mobile telephone and the like. Similarly, the pre-determined accessories may be, for example, a set of earphones, a set of headphones, a set of speakers, a digital storage device 66 protector, a digital storage device 66 case, a power source for the digital storage device 66, a cable for connection to the digital storage device 66, a lanyard for carrying the digital storage device 66, any combination of the aforementioned items and so forth.

Figure 3:
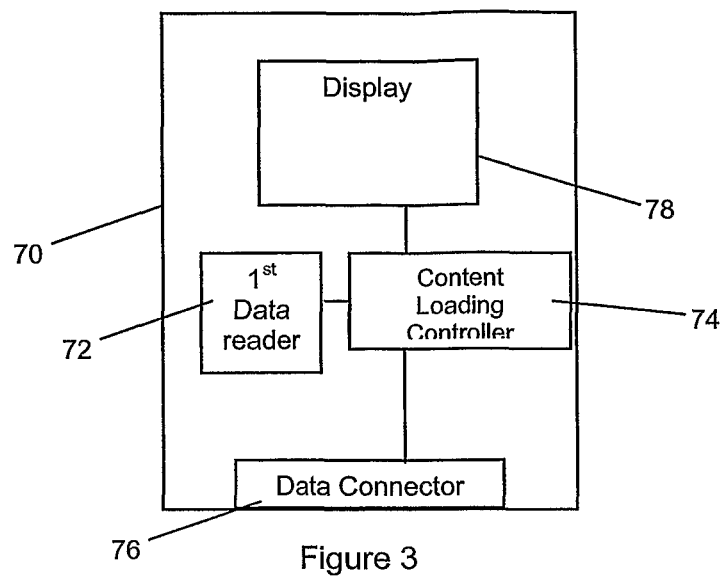
FIG. 3 shows a schematic view of a digital content loading post of the present invention.
Figure 4:
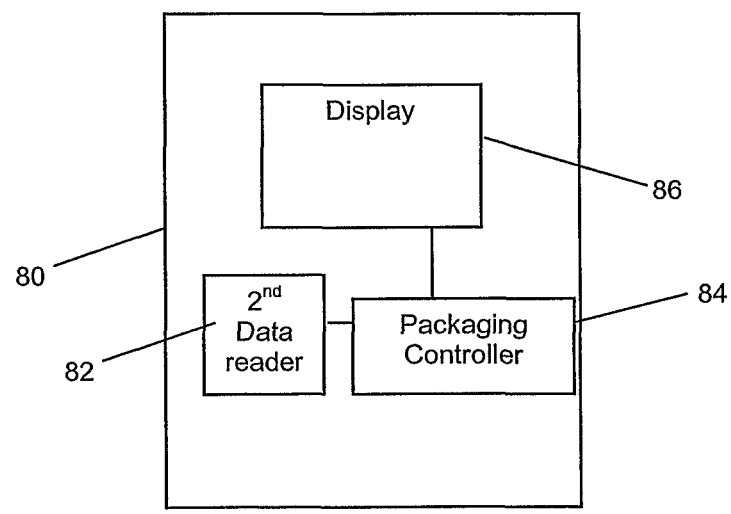
FIG. 4 shows a schematic view of a packaging post of the present invention.

Reference will also be made to FIGS. 3-4 in the following sections describing the method 20. FIG. 2 shows an overview of a system 60 for loading varied pre-determined digital content into a plurality of digital storage devices, and subsequently providing each digital storage device with varied pre-determined accessories. FIGS. 3 and 4 show schematic views of a digital content loading post 70 and a packaging post 80 respectively.

In a preferred embodiment, the method 20 includes locating (21) each digital storage device 66 on a platform 62, where the platform 62 may be placed on a conveyor belt 64. Each digital storage device 66 may include at least one device identification object 68, the at least one device identification object 68 may be, for example, an RFID tag, a visual indicia tag, a bar code tag, a serial number tag, any combination of the aforementioned and the like. The at least one device identification object 68 may be for identifying each digital storage device 66 in an affirmative manner, and may be either embedded or removable from each digital storage device 66. The at least one device identification object 68 may be of a type which allows the identity of each digital storage device 66 to be ascertained in either a contact-less manner or where direct visibility of the digital storage device 66 is not possible, which is likely when the digital storage device 66 is contained within a package. The at least one device identification object 68 is read and subsequently associated with an order for a digital storage device 66 (22) which is identical to the digital storage device 66 that the at least one device identification object 68 is either embedded in or adhered to.

Each platform 62 may include a connector for coupling the digital storage device 66 to the platform 62. Coupling the digital storage device 66 to the platform 62 (23) is also performed in the method 20. Coupling the digital storage device 66 to the platform 62 enables digital content to be transferred into the digital storage device 66, as digital content is transferred via a data connection on the platform 62, the platform 62 being able to be coupled to a digital content loading post 70.

Each platform 62 may also include a platform identification object 69 for identifying each platform 62 in an affirmative manner. The platform identification object 69 may preferably be a re-writable RFID tag so that the platform identification object 69 is able to be updated when each platform 62 is re-used in the method 20. The platform identification object 69 may store information such as, for example, platform 62 status, digital content loading post 70 status, and so forth. Further descriptions of use of the platform identification object 69 will be provided in subsequent portions of the description. The method 20 also includes resetting the platform identification object 69 (24) before, during or immediately after the coupling of the digital storage device 66 to the platform 62. A discrete identity of the platform identification object 69 is associated with a discrete identity of the at least one device identification object 68 to aid in monitoring progress of the digital storage device 66 during the course of method 20.

Figure 5:
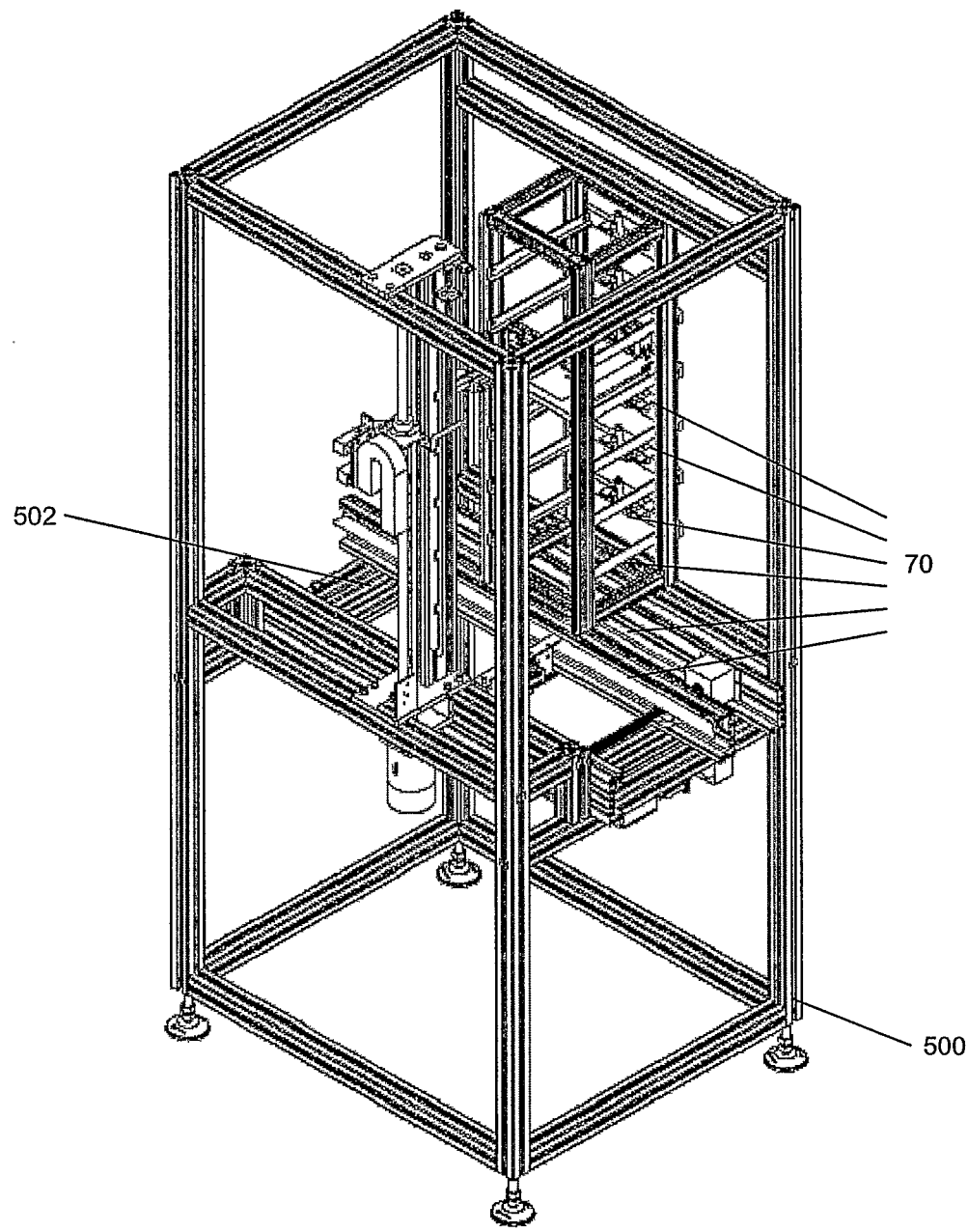
FIG. 5 shows a perspective view of a possible arrangement of a plurality of digital content loading posts of the present invention.

The method 20 includes determining an availability (25) of the digital content loading post 70 once the platform 62 is at a pre-determined position 63. Referring to FIG. 5, there is shown an illustrative perspective view of a possible set-up of a plurality of digital content loading posts 70. A support frame 500 aids in ensuring stability of the arrangement of a plurality of digital content loading posts 70. Six digital content loading posts 70 are arranged in a stacked vertical configuration. The stacked vertical configuration aids in maximizing a number of digital content loading posts 70 in a limited floor area.

While only six digital content loading posts 70 are shown, it should be appreciated that there may be more than six digital content loading posts 70 in the stacked vertical configuration. A feeder 502 for guiding the platform 62 into available digital content loading posts 70 is also shown. It should also be appreciated that the set-up shown in FIG. 5 is not limiting and may be varied from what is depicted in FIG. 5. A plurality of the set-up shown in FIG. 5 may be employed in the method 20.

The pre-determined position 63 may include at least one first controller 65 which will enable transportation (27) of the platform 62 to an available digital content loading post 70. It should be appreciated that the at least one first controller 65 may be in a form of either the feeder 502 (as shown in FIG. 5) or a mechanical setup which operates to transport the platform 62. The at least one first controller 65 may be configured/programmed to transport the platform 62 in a manner where the platform 62 is transported to the digital content loading post 70 which is most accessible (in a shortest time) to a subsequent station after digital content loading. For example, when the digital content loading posts 70 are in the stacked vertical configuration as shown in FIG. 5, the at least one first controller 65 would transport the platform 62 to a lowest available digital content loading post 70, since a time to transport the platform 62 from the lowest available digital content loading post 70 to the subsequent station would be less than from a higher digital content loading post 70. In another example, when the digital content loading posts 70 are in arranged in a horizontal row, the at least one first controller 65 would transport the platform 62 to an available digital content loading post 70 closest to the subsequent station (or furthest from the pre-determined position 63), since this allows a second platform 62 to be loaded into a digital content loading post 70 which is closer to the pre-determined position 63 when a first platform 62 is being loaded at the available digital content loading post 70 closest to the subsequent station.

It should be appreciated that when a digital content loading post 70 is in use, the at least one first controller 65 recognises an unavailability of the digital content loading post 70 and bypasses the unavailable digital content loading posts 70 when directing the platform 62.

The enablement provided by the at least one first controller 65 may relate to guiding the platform 62 towards the available digital content loading post 70. Guiding the platform 62 may include, for example, redirection along the conveyor belt 64 to the available digital content loading post 70, lifting and placement of the platform 62 at the available digital content loading post 70, lowering of the platform 62 to the available digital content loading post 70 and so forth. The pre-determined position 63 may also include at least one first sensor to determine a presence of the platform 62.

If the at least one first controller 65 determines that there is no available digital content loading post 70 (26), the platform 62 may either be held up at the predetermined position 63, or may be placed at a holding area 67. The holding area 67 may be another portion of the pre-determined position 63 which allows the at least one controller 65 to enable transportation of the platform 62 once there is an available digital content loading post 70. It is preferable that the holding area 67 is able to contain a plurality of platforms 62 and prevents an accumulation of a plurality of the platforms 62 at the pre-determined position 63 as such an instance will be unfavourable if the plurality of platforms 62 are on the conveyor belt 64. This is because a pile-up of the platforms 62 may damage the digital storage device 66 on the platform 62.

When the digital storage device 66 on the platform 62 is at an available digital content loading post 70, the digital storage device 66 is identified (28) from either the at least one device identification object 68 or the platform identification object 69. This is because an identity of the platform 62 is associated with an identity of the digital storage device 66 which is associated with the order for a digital storage device 66.

Referring to FIG. 3, there is shown a schematic diagram of the digital content loading post 70. The functionality of the digital content loading post 70 will be described in further detail at a subsequent section. A first data reader 72 of the digital content loading post 70 is used to read either the at least one device identification object 68 of the digital storage device 66 or the platform identification object 69.

Once the digital storage device 66 has been identified, a content loading controller 74 of the digital content loading post 70 associates (30) the identified digital storage device 66 with the order. The order may include, for example, type of digital storage device 66 being ordered, a list of digital content being ordered, a purchaser's shipping address, a purchaser's name, and other information which may be used for a purchase of a digital storage device and digital content. However, it is preferable that the list of digital content being ordered is in a form which is understandable only by the content loading controller 74 and not by any other person.

This aids in ensuring privacy of the purchaser as the list of digital content being ordered by the purchaser is not known to any other person.

Subsequently, a data connector 76 of the digital content loading post 70 may connect to the platform 62 via either a wired connection or a wireless connection. It should be appreciated that the data connector 76 may also be directly connected to the digital storage device 66. This may occur in instances where the digital storage device 66 is not coupled to the platform 62. After the platform 62 is connected to the digital content loading post 70, digital content is loaded (32) into the digital storage device 66 in accordance with the list of digital content being ordered in the associated order.

Upon completion of data loading, data on the device identification object 68 may be logged back to a database by the content loading controller 74. This may enable the device identification object 68 to be used at any subsequent portion of the method 20.

After the digital content is loaded into the digital storage device 66 via the platform 62, the content loading controller 74 discharges the platform 62 from the digital content loading post 70. Any issues which occur during the loading of digital content into the digital storage device 66 will be written by the content loading controller 74 onto the platform identification object 69. By doing this, the platform identification object 69 is able to store information relating to workability of the plurality of digital content loading posts 70. For example, if information from the platform identification objects 69 from various platforms 62 indicate that content loading fails at a particular digital content loading post 70, the obtained information will indicate a likely problem with that particular digital content loading post 70. Thus, a constant flow of information is available which indicates at least the workability of each of the plurality of digital content loading posts 70.

After the platform 62 is discharged from the digital content loading post 70, the platform 62 may be de-coupled from the digital storage device 66 and the platform 62 may be removed. It may be at this juncture where the platform identification object 69 of each platform 62 is read and where the information is obtained to determine at least the workability of each of the plurality of digital content loading posts 70.

Subsequently, the digital storage device 66 is transported to an available packaging post 80 (34). The digital storage device 66 may be transported using, for example, a conveyor belt, a mechanical transporter, a human transporter, and so forth. Referring to FIG. 4, there is shown a schematic diagram of the packaging post 80. The functionality of the packaging post 80 will be described in further detail at a subsequent section.

Referring to FIG. 4, a second data reader 82 of the packaging post 80 is used to read the at least one device identification object 68 of the digital storage device 66 to identify the digital storage device 66 at the packaging post 80 (38). Once the digital storage device 66 has been identified at the packaging post 80, a packing controller 84 of the packaging post 80 associates (40) the identified digital storage device 66 with the earlier associated order. The order may also include a list of accessories being ordered. The packaging controller 84 accounts for the accessories provided in accordance with the order (42). Accounting for the accessories may be by counter-checking a presence of the requisite accessories in the order. For example, a bar-code scanning system may be employed for the counter-checking process, where scanning of a bar-code for a particular accessory indicates the presence of the accessory.

A shipping label is printed (44) when the identity of the digital storage device 66 matches with the accounted pre-determined accessories in the order. This step ensures that the shipping label is only prepared when the digital storage device 66 and the accessories are in a state where they can be consolidated and put together in a single package (46). The bar-code scanning system mentioned earlier may be a first check for ensuring that the accessories are in place to be consolidated. A further check for determining the state may be done using a weighing scale, where the digital storage device 66 and the accessories are weighed to ensure that a cumulative weight is similar to a cumulative weight of items in the order within a certain tolerance limit. It should be appreciated that the bar-code scanning system and the weighing scale are purely illustrative and should not be considered limiting in any form or manner.

The shipping label may then be adhered onto the single package (48). The single package may be in a form which is dependent on dimensions of both the digital storage device 66, and the pre-determined accessories, thereby minimizing wastage of packaging material used for the single package. A weighting controller may be employed to ensure that the single package is being pasted with the correct shipping label by comparing an identity of the digital storage device 66 and the order, and this aids in ensuring that the shipping label is correctly adhered.

The method 20 may also further include checking a capability of the digital storage device 66. The at least one device identification object 68 of the digital storage device 66 may include information denoting the capability of the digital storage device 66. Even though the at least on device identification object 68 may be a read-only object containing a unique ID, the unique ID may be associated with a serial number of the digital storage device 66. The serial number may indicate a capability of the digital storage device 66. Thus, when the first data reader 72 of the digital content loading post 70 determines the identity of the digital storage device 66 and obtains information of the capability of the digital storage device 66, the digital content being loaded into the digital storage device 66 may vary according to the capability of the digital storage device 66. For instance, if the digital storage device 66 is able to support and/or playback high definition images (both still and moving), the loading controller 74 of the digital loading post 70 would load the digital storage device 66 with high definition content.

The digital content loading post 70 shown in FIG. 3 will now be described in greater detail for the sake of clarity. The digital content loading post 70 includes at least one data connector 76 to either the platform 62 or the digital storage device 66, with the connection being via either a wired connection or a wireless connection. The connection 76 may be connected to the content loading controller 74, the content loading controller 74 being for controlling the digital content loading post 70. The digital content loading post 70 may include at least one display 78 connected to the loading controller 74, the at least one display 78 being for viewing a graphic representation of the loading of the digital content into the digital storage device 66. It should be appreciated that a plurality of the digital content loading post 70 may be connected to a single display 78 for monitoring the graphical representation of the loading of digital content into digital storage device 66 at each digital content loading post 70. The digital loading post 70 may also include at least one first data reader 72 connected to the content loading controller 74. The at least one first data reader 72 may be for obtaining data from the at least one device identification object 68 of each digital storage device 66. The data may include the identity of the digital storage device 66, and the at least one first data reader 72 may be for obtaining data such as, for example, RF signals, visual indicia, bar codes, serial numbers, any combination of the aforementioned and so forth.

Similarly, the packaging post 80 in FIG. 4 will now be described in greater detail for the sake of clarity. The packaging post 80 includes at least one packaging controller 84 for aiding packaging of both the digital storage device 66 and the pre-determined accessories. There may also be at least one display 86 connected to the packaging controller 84, the display 86 being for viewing a list of the pre-determined accessories ordered with the digital storage device 66. It should be appreciated that a plurality of the packaging post 80 may be connected to a single display 86 for monitoring the list of the pre-determined accessories ordered with the digital storage device 66 at each packaging post 80. The packaging post 80 may also have at least one second data reader 82 connected to the packaging controller 84 to obtain data from the device identification object 68 of the digital storage device 66. The at least one second data reader 82 may be for obtaining data such as, for example, RF signals, visual indicia, bar codes, serial numbers, any combination of the aforementioned and so forth.

In a second aspect as shown in FIGS. 2-5, there is shown a system 60 for loading varied pre-determined digital content into a plurality of digital storage devices 66, and subsequently providing each digital storage device 66 with varied pre-determined accessories. The digital content may be predetermined by a user/purchaser of each digital storage device 66. The digital content may be selected by the user/purchaser of each digital storage device 66 such that the digital storage device 66 obtained by the user/purchaser contains digital content which is desired by the user/purchaser. The selection of the digital content may either be a component of a process to purchase a digital storage device 66 or may be a separate financial transaction for the purchase of digital content. A list of the digital content and accessories selected by the user/purchaser may be stored at a storage facility which is accessible from a location with the system 60.

The digital content may be, for example, audio files, movie files, image files, application files, firmware update files or any combination of the aforementioned. The digital storage device 66 may be, for example, a digital storage chip in any particular form, a portable hard disk drive, a digital media player, a mobile telephone and the like. Similarly, the pre-determined accessories may be, for example, a set of earphones, a set of headphones, a set of speakers, a digital storage device 66 protector, a digital storage device 66 case, a power source for the digital storage device 66, a cable for connection to the digital storage device 66, a lanyard for carrying the digital storage device 66, any combination of the aforementioned items and so forth.

In a preferred embodiment, the system 60 includes a platform 62 with the digital storage device 66 where the platform 62 may be on a conveyor belt 64. Each digital storage device 66 may include at least one device identification object 68, the at least one device identification object 68 may be, for example, an RFID tag, a visual indicia tag, a bar code tag, a serial number tag, any combination of the aforementioned and the like. The at least one device identification object 68 may be for identifying each digital storage device 66 in an affirmative manner, and may be either embedded or removable from each digital storage device 66. The at least one device identification object 68 may be of a type which allows the identity of each digital storage device 66 to be ascertained in either a contact-less manner or where direct visibility of the digital storage device 66 is not possible, which is likely when the digital storage device 66 is contained within a package. The at least one device identification object 68 is read and subsequently associated with an order for a digital storage device 66 which is identical to the digital storage device 66 that the at least one device identification object 68 is either embedded in or adhered to.

Each platform 62 may include a connector for coupling the digital storage device 66 to the platform 62. Coupling the digital storage device 66 to the platform 62 is also performed. Coupling the digital storage device 66 to the platform 62 enables digital content to be transferred into the digital storage device 66, as digital content is transferred via a data connection on the platform 62, the platform 62 being able to be coupled to a digital content loading post 70.

Each platform 62 may also include a platform identification object 69 for identifying each platform 62 in an affirmative manner. The platform identification object 69 may preferably be a re-writable RFID tag so that the platform identification object 69 is able to be updated when each platform 62 is re-used in the system 60. The platform identification object 69 may store information such as, for example, platform 62 status, digital content loading post 70 status, and so forth. Further descriptions of use of the platform identification object 69 will be provided in subsequent portions of the description. The system 60 may include resetting the platform identification object 69 before, during or immediately after the coupling of the digital storage device 66 to the platform 62. A discrete identity of the platform identification object 69 is associated with a discrete identity of the at least one device identification object 68 to aid in monitoring progress of the digital storage device 66 in the system 60.

The system 60 may include a pre-determined position 63 with at least one first controller 65 which will enable transportation of the platform 62 to an available digital content loading post 70. It should be appreciated that the at least one first controller 65 may be in a form of either the feeder 502 (as shown in FIG. 5) or a mechanical setup which operates to transport the platform 62. In the system 60, the at least one first controller 65 may be configured/programmed to transport the platform 62 in a manner where the platform 62 is transported to the digital content loading post 70 which is most accessible (in a shortest time) to a subsequent station after digital content loading. For example, when the digital content loading posts 70 are in the stacked vertical configuration as shown in FIG. 5, the at least one first controller 65 would transport the platform 62 to a lowest available digital content loading post 70, since a time to transport the platform 62 from the lowest available digital content loading post 70 to the subsequent station would be less than from a higher digital content loading post 70. In another example, when the digital content loading posts 70 are in arranged in a horizontal row, the at least one first controller 65 would transport the platform 62 to an available digital content loading post 70 closest to the subsequent station (or furthest from the pre-determined position 63), since this allows a second platform 62 to be loaded into a digital content loading post 70 which is closer to the pre-determined position 63 when a first platform 62 is being loaded at the available digital content loading post 70 closest to the subsequent station.

It should be appreciated that when a digital content loading post 70 is in use, the at least one first controller 65 recognises an unavailability of the digital content loading post 70 and bypasses the unavailable digital content loading posts 70 when directing the platform 62.

The enablement provided by the at least one first controller 65 may relate to guiding the platform 62 towards the available digital content loading post 70. Guiding the platform 62 may include, for example, redirection along the conveyor belt 64 to the available digital content loading post 70, lifting and placement of the platform 62 at the available digital content loading post 70, lowering of the platform 62 to the available digital content loading post 70 and so forth. The pre-determined position 63 may also include at least one first sensor to determine a presence of the platform 62.

The pre-determined position 63 may include a holding area 67. The holding area 67 may be another portion of the pre-determined position 63 which allows the at least one controller 65 to enable transportation of the platform 62 once there is an available digital content loading post 70. It is preferable that the holding area 67 is able to contain a plurality of platforms 62 and prevents an accumulation of a plurality of the platforms 62 at the pre-determined position 63 as such an instance will be unfavourable if the plurality of platforms 62 are on the conveyor belt 64. This is because a pile-up of the platforms 62 may damage the digital storage device 66 on the platform 62.

When the digital storage device 66 on the platform 62 is at an available digital content loading post 70, the digital storage device 66 is identified from either the at least one device identification object 68 or the platform identification object 69. This is because an identity of the platform 62 is associated with an identity of the digital storage device 66 which is associated with the order for a digital storage device 66. Referring to FIG. 3, there is shown a schematic diagram of the digital content loading post 70. The functionality of the digital content loading post 70 will be described in further detail at a subsequent section. A first data reader 72 of the digital content loading post 70 is used to read either the at least one device identification object 68 of the digital storage device 66 or the platform identification object 69.

Once the digital storage device 66 has been identified, a content loading controller 74 of the digital content loading post 70 associates the identified digital storage device 66 with the order. The order may include, for example, type of digital storage device 66 being ordered, a list of digital content being ordered, a purchaser's shipping address, a purchaser's name, and other information which may be used for a purchase of a digital storage device and digital content. However, it is preferable that the list of digital content being ordered is in a form which is understandable only by the content loading controller 74 and not by any other person. This aids in ensuring privacy of the purchaser as the list of digital content being ordered by the purchaser is not known to any other person.

Subsequently, a data connector 76 of the digital-content loading post 70 may connect to the platform 62 via either a wired connection or a wireless connection. It should be appreciated that the data connector 76 may also be directly connected to the digital storage device 66. This may occur in instances where the digital storage device 66 is not coupled to the platform 62. After the platform 62 is connected to the digital content loading post 70, digital content is loaded into the digital storage device 66 in accordance with the list of digital content being ordered in the associated order.

Upon completion of data loading, data on the device identification object 68 may be logged back to a database by the content loading controller 74. This may enable the device identification object 68 to be used at any subsequent portion of system 60.

After the digital content is loaded into the digital storage device 66 via the platform 62, the content loading controller 74 discharges the platform 62 from the digital content loading post 70. Any issues which occur during the loading of digital content into the digital storage device 66 will be written by the content loading controller 74 onto the platform identification object 69. By doing this, the platform identification object 69 is able to store information relating to workability of the plurality of digital content loading posts 70. For example, if information from the platform identification objects 69 from various platforms 62 indicate that content loading fails at a particular digital content loading post 70, the obtained information will indicate a likely problem with that particular digital content loading post 70. Thus, a constant flow of information is available which indicates at least the workability of each of the plurality of digital content loading posts 70.

After the platform 62 is discharged from the digital content loading post 70, the platform 62 may be de-coupled from the digital storage device 66 and the platform 62 may be removed. It may be at this juncture where the platform identification object 69 of each platform 62 is read and where the information is obtained to determine at least the workability of each of the plurality of digital content loading posts 70.

Subsequently, the digital storage device 66 is transported to an available packaging post 80. The digital storage device 66 may be transported using, for example, a conveyor belt, a mechanical transporter, a human transporter, and so forth. Referring to FIG. 4, there is shown a schematic diagram of the packaging post 80. The functionality of the packaging post 80 will be described in further detail at a subsequent section.

The digital content loading post 70 shown in FIG. 3 will now be described in greater detail for the sake of clarity. The digital content loading post 70 includes at least one data connector 76 to the platform 62, with the data connector 76 being via either a wired connection or a wireless connection. The connection 76 may be connected to the content loading controller 74, the content loading controller 76 being for controlling the digital loading post 70. The digital loading post 70 may include at least one display 78 connected to the loading controller 74, the at least one display 78 being for viewing a graphic representation of the loading of the digital content into the digital storage device 66. It should be appreciated that a plurality of the digital content loading post 70 may be connected to a single display 78 for monitoring the graphical representation of the loading of digital content into digital storage device 66 at each digital content loading post 70. The digital loading post 70 may also include at least one first data reader 72 connected to the content loading controller 74. The at least one first data reader 72 may be for obtaining data from the at least one device identification object 68 of each digital storage device 66. The data may include the identity of the digital storage device 66, and the at least one first data reader 72 may be for obtaining data such as, for example, RF signals, visual indicia, bar codes, serial numbers, any combination of the aforementioned and so forth.

Similarly, the packaging post 80 in FIG. 4 will now be described in greater detail for the sake of clarity. The packaging post 80 includes at least one packaging controller 84 for aiding packaging of both the digital storage device 66 and the pre-determined accessories. There may also be at least one display 86 connected to the packaging controller 84, the display 86 being for viewing a list of the pre-determined accessories ordered with the digital storage device 66. It should be appreciated that a plurality of the packaging post 80 may be connected to a single display 86 for monitoring the list of the pre-determined accessories ordered with the digital storage device 66 at each packaging post 80. The packaging post 80 may also have at least one second data reader 82 connected to the packaging controller 84 to obtain data from the device identification object 68 of the digital storage device 66. The at least one second data reader 82 may be for obtaining data such as, for example, RF signals, visual indicia, bar codes, serial numbers, any combination of the aforementioned and so forth.

Once the digital storage device 66 has been identified at the digital loading post, the loading controller 74 of the digital loading post 70 associates the identified digital storage device 66 with an order. The order may include, for example, a list of digital content being ordered, a purchaser's shipping address, a purchaser's name, and other information which may be used for a purchase of a digital storage device 66 and digital content. However, it is preferable that the list of digital content being ordered is in a form which is understandable only by the loading controller 74 and not by any other person.

This aids in ensuring privacy of the purchaser as the list of digital content being ordered by the purchaser is not known to any other person.

Whilst there has been described in the foregoing description preferred embodiments of the present invention, it will be understood by those skilled in the technology concerned that many variations or modifications in details of design or construction may be made without departing from the present invention.

The invention claimed is:

1. A method for loading varied pre-determined digital content into a plurality of digital storage devices, and subsequently providing each digital storage device with varied pre-determined accessories, the method including:
   locating each digital storage device on a platform, the platform including a platform identification object and each digital storage device including at least one device identification object;
   associating the at least one device identification object with an order;
   coupling the digital storage device to the platform;
   resetting the platform identification object, the platform identification object being for monitoring progress of the loading of digital content into each digital storage device;
   determining availability of a digital content loading post when the platform is at a pre-determined position;
   transporting the platform to an available digital content loading post;
   identifying the digital storage device on the platform at the available digital content loading post;
   associating the identified digital storage device with the order;
   loading digital content into the digital storage device at the available digital content loading post in accordance with the order;
   transporting the digital storage device to an available packaging post;
   identifying the digital storage device at the available packaging post;
   associating the digital storage device with the order;
   accounting for the pre-determined accessories provided in accordance with the order;
   printing a shipping label when the identity of the digital storage device matches with the accounted pre-determined accessories in the order; and
   consolidating the digital storage device and the pre-determined accessories together into a single package,
   wherein the digital content loaded into the digital storage device is not identifiable at the digital content loading post, and the consolidated digital storage device and the pre-determined accessories are shipped to particulars of the shipping label.

2. The method of claim 1, further including checking a capability of the digital storage device.

3. The method of claim 1, wherein the digital content is selected from a group comprising: audio files, movie files, image files, application files, firmware update files, and any combination of the aforementioned.

4. The method of claim 1, wherein the identification object is selected from a group comprising: an RFID tag, a visual indicia tag, a bar code tag, a serial number tag, and any combination of the aforementioned.

5. The method of claim 1, wherein the digital storage device is selected from a group comprising: a digital storage chip in any particular form, a portable hard disk drive, a digital media player, a mobile telephone, and any combination of the aforementioned.

6. The method of claim 1, wherein the pre-determined accessories is selected from a group comprising: a set of earphones, a set of headphones, a set of speakers, a digital storage device protector, a digital storage device case, a power source for the digital storage device, a cable for connection to the digital storage device, a lanyard for carrying the digital storage device, and any combination of the aforementioned items.

7. The method of claim 1, wherein the pre-determined position includes:
   at least one sensor to determine a presence of the platform, and
   at least a first controller to guide the platform to the available digital content loading post.

8. The method of claim 1, wherein the digital content loading post includes:
   a content loading controller for controlling the digital loading post; and
   at least one data connector for a functional connection to either the platform or the digital storage device, the connection being via either a wired connection or a wireless connection, the at least one connector being connected to the content loading controller;
   wherein workability information for the digital content loading post is written by the content loading controller onto the platform identification object.

9. The method of claim 1, wherein the packaging post includes:
   a packaging controller for aiding packaging of both the digital storage device and the pre-determined accessories;
   at least one display connected to the packaging controller to view a list of the pre-determined accessories ordered with the digital storage device; and
   at least one data reader connected to the packaging controller to obtain data from the identification object of the digital storage device, the data reader being for obtaining data selected from a group comprising: RF signals, visual indicia, bar codes, serial numbers, and any combination of the aforementioned.

10. A system for loading varied pre-determined digital content into a plurality of digital storage devices, and subsequently providing each digital storage device with varied pre-determined accessories, the system including:
   a platform with a digital storage device, the platform being functionally coupled to the digital storage device and including a platform identification object for monitoring progress of the loading of digital content into each digital storage device, and the digital storage device including at least one device identification object;
   a pre-determined position with a first controller for guiding the platform to an available digital content loading post, the digital content loading post being for loading of digital content into the digital storage device; and
   a packaging post for consolidating the digital storage device and the accessories, wherein the digital content loaded into the digital storage device is not identifiable at the digital content loading post, and the consolidated digital storage device and the pre-determined accessories are shipped to particulars of a shipping label printed at the packaging post.

11. The system of claim 10, wherein the digital content is selected from a group comprising: audio files, movie files, image files, application files, firmware update files, and any combination of the aforementioned.

12. The system of claim 10, wherein the device identification object is selected from a group comprising: an RFID tag, a visual indicia tag, a bar code tag, a serial number tag, and any combination of the aforementioned.

13. The system of claim 10, wherein the digital storage device is selected from a group comprising: a digital storage chip in a form of a card, a portable hard disk drive, a digital media player, a mobile telephone, and any combination of the aforementioned.

14. The system of claim 10, wherein the pre-determined accessories is selected from a group comprising: a set of earphones, a set of headphones, a set of speakers, a digital storage device protector, a digital storage device case, a power source for the digital storage device, a cable for connection to the digital storage device, a lanyard for carrying the digital storage device, and any combination of the aforementioned items.

15. The system of claim 10, wherein the pre-determined position including at least one sensor to determine a presence of the platform.

16. The system of claim 10, wherein the digital content loading post includes:
   a content loading controller for controlling the digital loading post; and
   at least one data connector for a functional connection to either the platform or the digital storage device, the connection being via either a wired connection or a wireless connection, the at least one data connector being connected to the content loading controller;
   wherein workability information for the digital content loading post is written by the content loading controller onto the platform identification object.

17. The system of claim 10, wherein the packaging post includes:
   a packaging controller for aiding packaging of both the digital storage device and the pre-determined accessories;
   at least one display connected to the packaging controller to view a list of the pre-determined accessories ordered with the digital storage device; and
   at least one data reader connected to the packaging controller to obtain data from the identification object of the digital storage device, the data reader being for obtaining data selected from a group comprising: RF signals, visual indicia, bar codes, serial numbers, and any combination of the aforementioned.

* * * * *